(12) United States Patent
Watanabe et al.

(10) Patent No.: US 9,157,504 B2
(45) Date of Patent: Oct. 13, 2015

(54) ANCHORING DEVICE FOR FILAMENT BODY MADE OF FIBER REINFORCED PLASTIC

(71) Applicants: KYOKUTO KOGEN CONCRETE SHINKO CO., LTD., Tokyo (JP); TOKYO ROPE MANUFACTURING CO., LTD., Tokyo (JP)

(72) Inventors: Koji Watanabe, Tokyo (JP); Minoru Okada, Tokyo (JP); Yanke Zhao, Aichi (JP); Takayuki Okeno, Aichi (JP)

(73) Assignees: KYOKUTO KOGEN CONCRETE SHINKO CO., LTD., Tokyo (JP); TOKYO ROPE MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/234,223

(22) PCT Filed: May 20, 2013

(86) PCT No.: PCT/JP2013/003209
§ 371 (c)(1),
(2) Date: Jan. 22, 2014

(87) PCT Pub. No.: WO2014/188469
PCT Pub. Date: Nov. 27, 2014

(65) Prior Publication Data
US 2014/0341646 A1    Nov. 20, 2014

(51) Int. Cl.
*F16G 11/04* (2006.01)
*E04C 5/12* (2006.01)
(52) U.S. Cl.
CPC ............... *F16G 11/04* (2013.01); *E04C 5/127* (2013.01); *Y10T 403/7039* (2015.01)
(58) Field of Classification Search
CPC .......... E04C 5/122; E04C 5/127; F16G 11/04

USPC ................... 403/367–370; 52/223.13, 223.14
See application file for complete search history.

(56) References Cited

U.S. PATENT DOCUMENTS 2,618,147 A * 11/1952 Freyssinet .................. 52/223.13
2,686,963 A * 8/1954 Freyssinet ..................... 264/249
(Continued)

FOREIGN PATENT DOCUMENTS

JP        63-143597        9/1988
JP         8-21033         1/1996
(Continued)

OTHER PUBLICATIONS

International Search Report (ISR) issued Aug. 13, 2013 in International (PCT) Application No. PCT/JP2013/003209.

*Primary Examiner* — Joshua Kennedy
(74) *Attorney, Agent, or Firm* — Wenderoth, Lind & Ponack, L.L.P.

(57) ABSTRACT

An anchoring device secures tendons formed of a filament body made of fiber reinforced plastic by inserting a male member into a female member to sandwich the tendons between them. Each of the female member and the male member is formed in a tapered shape inclined from one end toward the other end and the female member and the male member include a plurality of mount portions at predetermined intervals in a circumferential direction of an inclined tapered face between the female member and the male member, each of the plurality of tendons being placed on a different one of the mount portions. The length from the one end to the other end of each of the female member and the male member corresponding to a length direction of the tapered face in contact with the tendon is equal to or larger than 130 mm.

7 Claims, 5 Drawing Sheets

(56) References Cited

U.S. PATENT DOCUMENTS

| | | | |
|---|---|---|---|
| 3,045,305 A * | 7/1962 | Anderson | 403/171 |
| 3,522,682 A * | 8/1970 | Annex et al. | 52/223.13 |
| 3,600,765 A * | 8/1971 | Rovinsky et al. | 24/122.6 |
| 3,605,202 A * | 9/1971 | De Valenzuela | 24/122.6 |
| 3,676,899 A * | 7/1972 | Ehlert | 403/247 |
| 3,676,900 A * | 7/1972 | De Valenzuela | 403/374.2 |
| 3,822,442 A * | 7/1974 | Herbschleb et al. | 24/122.6 |
| 4,507,008 A * | 3/1985 | Adl et al. | 403/275 |
| 5,233,730 A * | 8/1993 | Milne et al. | 24/136 R |
| 6,082,063 A * | 7/2000 | Shrive et al. | 52/223.13 |
| 6,487,757 B1 * | 12/2002 | Stubler et al. | 24/122.6 |
| 8,425,143 B2 * | 4/2013 | Kondo et al. | 403/368 |
| 2008/0279622 A1 * | 11/2008 | Al-Mayah et al. | 403/374.1 |
| 2012/0141198 A1 | 6/2012 | Kondo et al. | |

FOREIGN PATENT DOCUMENTS

| | | |
|---|---|---|
| JP | 2005-155081 | 6/2005 |
| JP | 2006-257677 | 9/2006 |
| WO | 2011/019075 | 2/2011 |

* cited by examiner

ANCHORING DEVICE FOR FILAMENT BODY MADE OF FIBER REINFORCED PLASTIC

BACKGROUND OF THE INVENTION

1. Field of the Invention

The present invention relates to an anchoring device for a filament body made of fiber reinforced plastic.

2. Description of Related Art

A filament body made of fiber reinforced plastic (composite cable) is one of tendons conventionally used for prestressed concrete. The filament body made of fiber reinforced plastic is a composite material combining carbon fiber, aramid fiber, or glass fiber having high strength, high elasticity, and high heat resistance with epoxy resin, vinylester resin or the like. The filament body made of fiber reinforced plastic has higher corrosion resistance and higher tensile strength than those of a PC steel wire.

It is known, however, that the filament body made of fiber reinforced plastic may be broken when it acts shearing force, local bending, lateral pressure or the like. This presents a problem in which it is difficult to secure the filament body made of fiber reinforced plastic to an anchoring device with a sufficient tensile load maintained. International Publication WO 2011/019075 has disclosed an anchoring structure in which a buffering layer is provided around an anchoring portion of a filament body made of fiber reinforced plastic wedged on an anchoring device. In International Publication WO 2011/019075, the buffering layer reduces shearing force acting on the filament body made of fiber reinforced plastic.

In International Publication WO 2011/019075, a buffer such as a braided net is placed on the filament body made of fiber reinforced plastic wedged into a socket to provide the buffering layer between the filament body made of fiber reinforced plastic which is weak against shearing force and the wedge. The buffering layer distributes (buffers) the shearing force applied by the wedge locally to the filament body made of fiber reinforced plastic to reduce breaks of the filament body made of fiber reinforced plastic at the position of the wedging.

The anchoring structure for the filament body made of fiber reinforced plastic described in International Publication WO 2011/019075, however, does not distribute the shearing force applied by the wedge locally to the filament body made of fiber reinforced plastic. In other words, International Publication WO 2011/019075 provides the structure in which the buffer independent of the anchoring structure distributes the shearing force applied locally to the filament body made of fiber reinforced plastic.

For securing a plurality of tendons, the anchoring device described in International Publication WO 2011/019075 requires a plurality of male members (wedges) and a plurality of female members (sockets) associated with the plurality of tendons. The plurality of tendons is secured through individual wedge effects which apply lateral pressure to the respective tendons.

On the other hand, there is an anchoring structure in which a single anchoring device anchors a plurality of tendons in some of anchoring devices for PC steel wire. The anchoring device is formed of a male member of conical shape and a female member having a conical hollow into which the male member is inserted, and the plurality of tendons are placed at predetermined intervals around a tapered face of each of the male member and the female member. The plurality of tendons is anchored by the male member on the tapered circumferential face of the female member. In the anchoring device, each of the tendons is not secured through independent wedging of the male member and the female member, and the portion for anchoring the tendon is tapered and inclined relative to an axial direction. The anchoring device anchors the tendon by applying lateral pressure from the wedge effect to the tendon along the inclined tapered face. In such an anchoring structure, a higher pressure due to the wedge effect is applied to the tendon than in the anchoring device as described in International Publication WO 2011/019075 in which the lateral pressure is applied perpendicularly to the tendon against a tensile load applied in the axial direction of the anchoring device.

As a result, the anchoring device in which the plurality of tendons are placed at the predetermined intervals in the circumferential direction of the tapered face of each of the single male member and the single female member cannot appropriately anchor the tendons formed of the filament body made of fiber reinforced plastic which is weak against the shearing force and the like than the PC steel wire.

BRIEF SUMMARY OF THE INVENTION

It is thus an object of the present invention to provide an anchoring device for a filament body made of fiber reinforced plastic in which a male member is inserted into a female member to sandwich tendons formed of the filament body made of fiber reinforced plastic between them and the tendons are placed at predetermined intervals in a circumferential direction of a tapered face formed between the female member and the male member.

According to a first aspect, the present invention provides an anchoring device for a filament body made of fiber reinforced plastic in which a male member is inserted into a female member to sandwich and secure tendons formed of the filament body made of fiber reinforced plastic between them. Each of the female member and the male member is formed in a tapered shape inclined from one end toward the other end and the female member and the male member include a plurality of mount portions at predetermined intervals in a circumferential direction of an inclined tapered face between the female member and the male member, each of the plurality of tendons being placed on a different one of the mount portions. The length from the one end to the other end of each of the female member and the male member corresponding to a length direction of the tapered face in contact with the tendon is equal to or larger than 130 mm.

According to the first aspect of the present invention, since the large length of 130 mm or more is used as the length over which a lateral pressure acts on the tendon placed to be inclined along the tapered face, the lateral pressure acts on a larger section (region length) of the tendon formed of the filament body made of fiber reinforced plastic. This can distribute the lateral pressure for the tensile load (anchoring force from the wedge effect). Consequently, as compared with a shorter section where the lateral pressure acts, the application of an excessive lateral pressure can be prevented to achieve the anchoring which hardly causes breaks or the like of the tendon formed of the filament body made of fiber reinforced plastic.

More preferably, the length over which the lateral pressure acts on the tendon placed to be inclined along the tapered face can be equal to or larger than 150 mm. This can realize the more stable anchoring of the filament body made of fiber reinforced plastic.

The length over which the lateral pressure acts on the tendon placed to be inclined along the tapered face can be equal to or smaller than 300 mm. This can realize the more stable anchoring of the filament body made of fiber reinforced plastic while the anchoring device can be reduced in size and weight.

The anchoring device can include an auxiliary member placed between the mount portion and the tendon, and extending from the one end toward the other end along the tapered face.

The male member of the anchoring device can include a first arc-shaped mount portion formed in a concave shape inward from an outer circumferential face and contacting a circumferential face of the tendon, and the female member can include a second arc-shaped mount portion provided at a position associated with the first mount portion when the male member is inserted, the second mount portion being formed in a concave shape outward from an inner circumferential face and contacting the circumferential face of the tendon. The tendon is secured to the anchoring device such that the tendon is contacted and held by the first mount portion and the second mount portion in a circumferential direction.

BRIEF DESCRIPTION OF THE DRAWINGS

FIG. 1 is a diagram showing the configuration of an anchoring device for a filament body made of fiber reinforced plastic in Embodiment 1, wherein FIG. 1(a) shows examples of a front view and a section view of a female member and FIG. 1(b) shows examples of a front view and a side view of a male member.

FIG. 3 is a diagram showing an example of the anchoring device holding tendons in Embodiment 1, wherein FIG. 3(a) is a front view and FIG. 3(b) is a side view of the anchoring device used in a building structure.

DETAILED DESCRIPTION OF THE INVENTION

An embodiment of the present invention will hereinafter be described.

Embodiment 1

Figure 1:
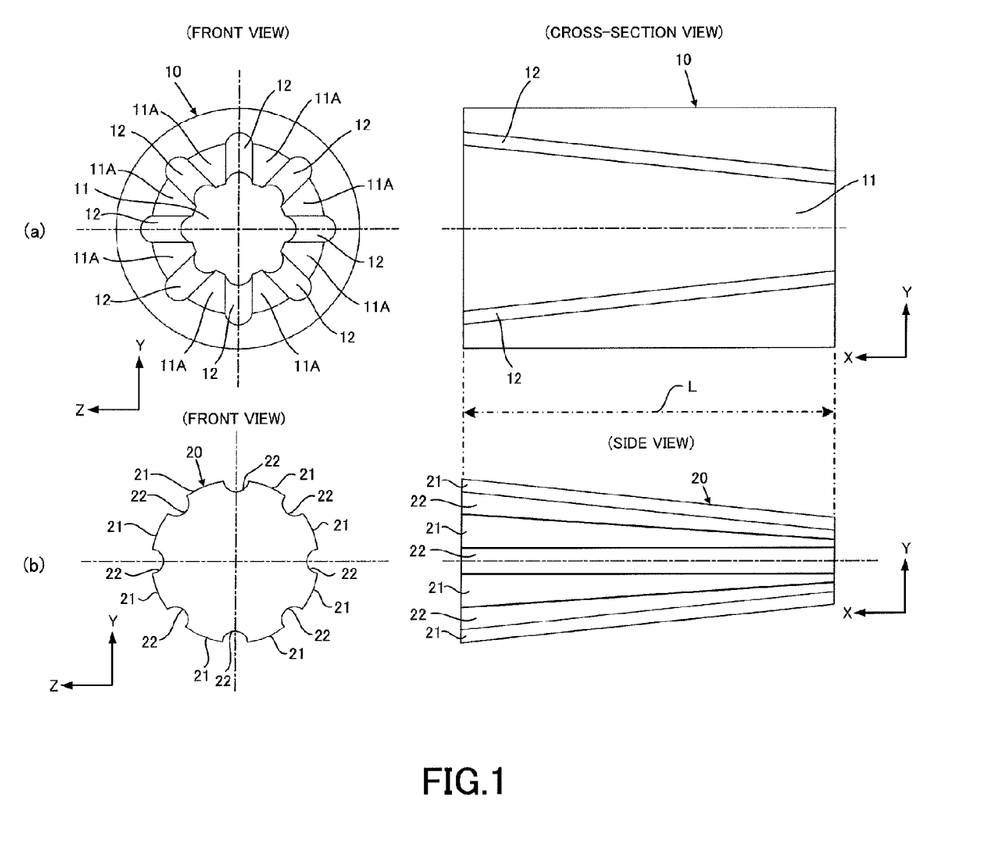

An anchoring device for a filament body made of fiber reinforced plastic which is Embodiment 1 of the present invention is described with reference to FIG. 1 to FIG. 5. FIG. 1 (a) shows examples of a front view and a section view of a female member 10 forming part of an anchoring device 1 of the present embodiment. FIG. 1 (b) shows examples of a front view and a side view of a male member 20. In FIG. 1 to FIG. 4, an X axis, a Y axis, and a Z axis are axes orthogonal to each other. In the present embodiment, the Y axis corresponds to a vertical direction.

The anchoring device 1 of the present embodiment secures a tendon C by inserting the male member 20 into the female member 10 and sandwiching the tendon C between the female member 10 and the male member 20. The anchoring device 1 is an anchoring apparatus for the tendon C used as a tensile member for prestressed concrete, for example, and can be used as an anchoring apparatus for a tensile member in a building structure, a bridge structure or the like.

The tendon C in the present embodiment is provided through the use of a filament body made of fiber reinforced plastic rather than a steel wire such as metal. The filament body made of fiber reinforced plastic is a composite material having higher corrosion resistance, higher tensile strength and the like than those of the PC steel wire, and is obtained by combining carbon fiber, aramid fiber, or glass fiber with epoxy resin, vinylester resin or the like. The tendon C is formed into the filament body by twisting together wires made of fiber reinforced plastic having a circular cross section, for example. The tendon C is formed to have a generally circular cross section as a whole.

The anchoring device 1 secures a plurality of tendons C. As shown in FIG. 1 (a), the female member 10 has an insertion hole 11 into which the male member 20 is inserted, and is formed in a cylindrical shape having a length L in the X direction. The insertion hole 11 has an inner circumferential face 11A formed in a tapered shape inclined from one end to the other end in an axial direction to provide a tapered face.

The tapered face 11A of the female member 10A has first mount portions 12 formed thereon at predetermined intervals in the circumferential direction to place the plurality of tendons C. The first mount portions 12 are provided at positions associated with second mount portions 22 of the male member 20 when it is inserted. Each of the first mount portions 12 is formed in a concave shape outward from the tapered face 11A. The first mount portion 12 can be formed in an arc shape in contact with the generally circular circumferential face of the tendon C, for example, and extends from one end to the other end of the female member 10 in the X direction.

As shown in FIG. 1(b), the male member 20 has an outer shape identical to or smaller than that of the insertion hole 11 of the female member 10 and is formed in a cylindrical shape. The male member 20 has a length L in the X direction similarly to the female member 10. The outer shape of the male member 20 is formed in a tapered shape in an axial direction inclined from one end to the other end in the X direction to have a tapered face 21 opposite to the tapered face 11A of the female member 10.

The male member 20 has the plurality of second mount portions 22 formed on the tapered face 21 at predetermined intervals in the circumferential direction in association with the first mount portions 12 of the female member 10. The second mount portion 22 is formed in a concave shape inward from the tapered face (outer circumferential face) 21. The second mount portion 22 can be formed in an arc shape to be in contact with the circumferential face of the tendon C. The second mount portion 22 extends from one end to the other end in the X direction.

The first mount portion 12 and the second mount portion 22 function as a mount portion 30 which contacts and holds the tendon C in the circumferential direction. The anchoring device 1 of the present embodiment includes a plurality of mount portions 30 at predetermined intervals in the circumferential direction of the inclined tapered faces 11A and 21 between the female member 10 and the male member 20. The anchoring device 1 has an anchoring structure for collectively securing the plurality of tendons C together.

Although the present embodiment illustrates the anchoring device 1 for securing eight tendons C, the present inventions is not limited thereto. For example, the anchoring device 1 can be formed to include a plurality of mount portions 30 for an arbitrary number of tendons C equal to or larger than two. The upper limit number of mount portions 30 (upper limit number of tendons C) can be set in view of the sizes of the tendon C, the female member 10, and the male member 20. The interval between the mount portions 30 in the circumferential direction can be set as appropriate in accordance with the number of mount portions 30.

Figure 2:
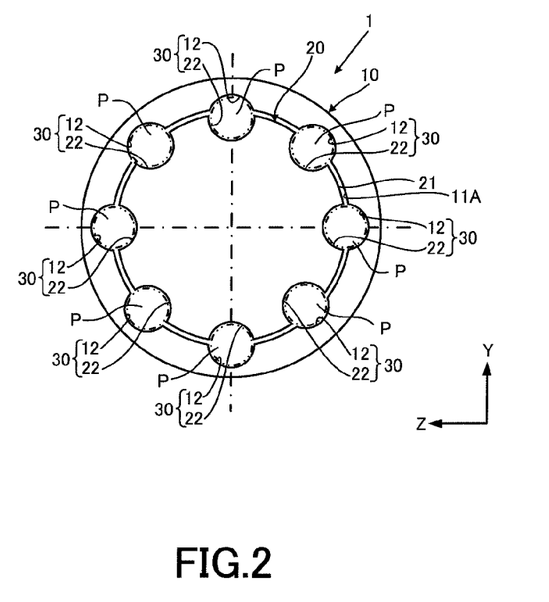
FIG. 2 is an exemplary front view of the male member inserted into the female member in Embodiment 1.

FIG. 2 is a diagram showing the male member 20 inserted into the female member 10. As shown in FIG. 2, while the male member 20 is inserted into the female member 10, the inclined tapered faces 11A and 21 are positioned opposite to each other with a predetermined spacing between them. The plurality of mount portions 30 are formed at the predetermined intervals in the circumferential direction of the tapered face between the female member 10 and the male member 20. The opposed placement of the first mount portions 12 and the second mount portions 22 of arc shape (semicircular shape) forms placement spaces P for the tendons C on the tapered face between the female member 10 and the male member 20. The placement space P is smaller than the generally circular sectional shape of the tendon C such that the tendon C is contacted and held by the first mount portion 12 and the second mount portion 22 in the circumferential direction.

Figure 3:
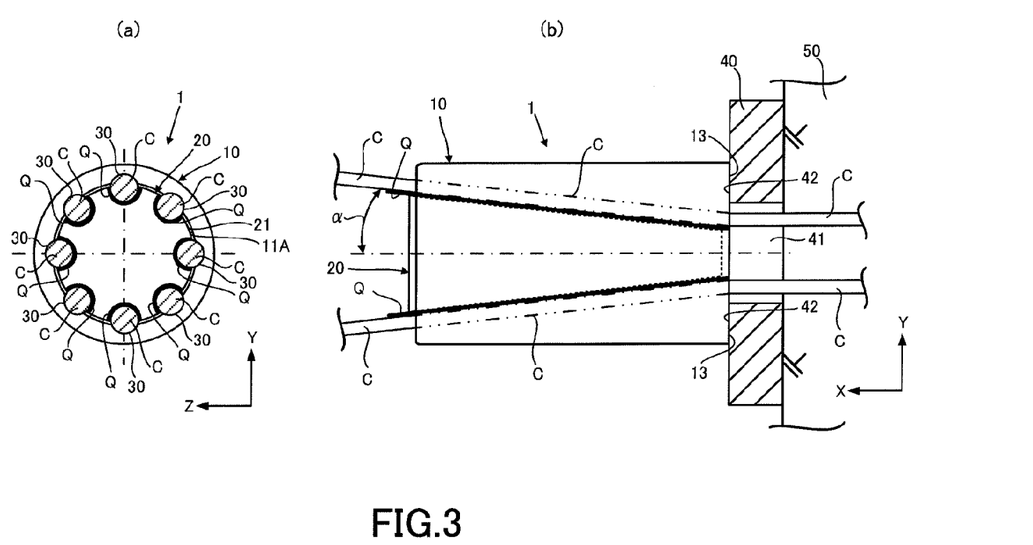
Figure 4:
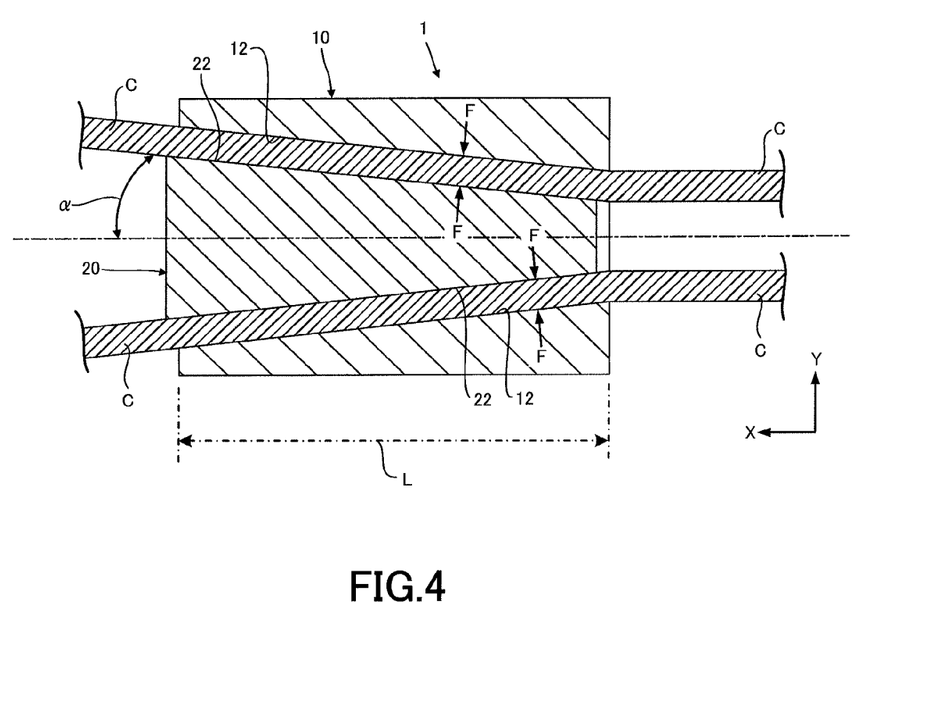
FIG. 4 is a section view of the anchoring device holding the tendons in Embodiment 1.

FIG. 3 is a diagram showing the anchoring device 1 of the present embodiment in use which holds the tendons C. FIG. 4 is a section view of the anchoring device 1 in the X direction which holds the tendons C.

As shown in FIG. 3(b), the anchoring device 1 can be mounted on a building, for example. The anchoring device 1 can be provided for a concrete 50 with a pressure bearing plate 40 interposed between them. A tensile load (tensile force) in the X direction on the tendon C is applied to the concrete 50 from the anchoring device 1 through the pressure bearing plate 40.

The pressure bearing plate 40 has a hole 41 into which the tendon C is inserted. The pressure bearing plate 40 is formed to be larger than the outer shape of the anchoring device 1 with the centered hole 41 into which the tendon C is inserted and to have a predetermined contact area for applying pressure to the concrete 50. An end face 13 of the female member 10 in the X direction contacts a contact face 42 around the hole 41 to mount the anchoring device 1 onto the concrete 50 with the pressure bearing plate 40 interposed therebetween. This can apply the tensile force to the concrete 50.

More specifically, for example in a workplace, the pressure bearing plate 40 is secured with a fastening member such as a bolt to the concrete 50 through which the tendon C should be extended. Next, the tendon C is inserted into the hole 41 of the pressure bearing plate 40 mounted on the concrete 50.

The tendon C inserted in the hole 41 of the pressure bearing plate 40 is inserted into the insertion hole 11 of the female member 10 from the concrete 50. In this state, the end face 13 of the female member 10 is contacted on the contact face 41 of the pressure bearing plate 40. Then, the male member 20 is inserted into the female member 10 with the tensile load applied to the tendon C in the X direction. The tendon C placed on the tapered circumferential face of the female member 10 is held by and secured to the anchoring device 1 with the male member 20 serving as a wedge and the resulting wedge effect of the female member 10 and the male member 20.

In the present embodiment, an auxiliary member Q is provided between the tendon C and the second mount portion 22, that is, between the male member 20 and the tendon C. The auxiliary member Q extends along the tapered face 21 from one end to the other end of the anchoring device 1 in the X direction. The auxiliary member Q is a friction sheet, for example. The friction sheet is formed by applying (bonding) polishing particles to a front face and a back face of a sheet of synthetic fiber or a fine-mesh wire net. The friction sheet is used to increase the friction force acting on the tendon C and can be provided at a terminal portion of the tendon C, that is, around the tendon C placed at the mount portion 30.

As shown in FIG. 3(a), the auxiliary member Q can be formed to have a shape (for example, an arc shape) conforming to the second mount portion 22 formed in the arc shape and contacting at least portion of the circumferential face of the tendon C. As shown in FIG. 3(b), the auxiliary member Q is formed to protrude by a predetermined length from the end portion of the mount portion 30 (end portion at a base end of the tendon C) opposite to the end face 13 of the anchoring device 1 contacting on the pressure bearing plate 40. Such a configuration can reduce shearing force or the like acting on the boundary between the portion of the tendon C in contact with the tapered face and the portion of the tendon C not in contact with the tapered face.

Although the present embodiment includes the auxiliary member Q provided only for part of the mount portion 30 (second mount portion 22), the present invention is not limited thereto. For example, the auxiliary member Q may be provided for the whole mount portion 30 (including the first mount portion 12 and the second mount portion 22) or only for part of the mount portion 30 (first mount portion 12). The auxiliary member Q may be provided integrally with or separately from the mount portion 30. The auxiliary member Q may be provided previously for the tendon C.

In the anchoring device 1 of the present embodiment, the tendon C extended in the X direction is sandwiched between the tapered faces 11A and 21 to be inclined relative to the X direction (the axial direction of the female member 10 and the male member 20). Thus, as shown in FIG. 3(b), the section area of the anchoring device 1 in the Y direction is gradually increased from the right end positioned at the building to the left end at the base end of the tendon C, and the tendon C is held by the anchoring device 1 to be inclined at an angle of α relative to the axial direction. The angle α corresponds to the tapering angle of the tapered faces 11A and 21.

As shown in the example of FIG. 3(b), the tendon C is extended in parallel to the X direction (axial direction) in the region from the right end of the anchoring device 1 (end face 13) toward the concrete 50. The tendon C, which is extended in parallel to the X direction to that right end, is extended to be inclined in the X direction along the tapered faces 11A and 21 in the anchoring region from that right end toward the left where the tendon C is held.

As described above, each of the plurality of tendons C placed radially in the circumferential direction of the tapered faces 11A and 21 is extended in parallel to the X direction (axial direction) in the region toward the concrete 50 and is extended to be inclined from the right end of the anchoring device 1 toward the left end at the tapered angle α of the tapered faces 11A and 21 such that the tendon C. each of the plurality of tendons C is secured to the anchoring device 1 through the wedge effect of the female member 10 and the male member 20.

Next, referring to FIG. 4, description is made of a lateral pressure F for securing, to the anchoring device 1, the tendon C to which the tensile load acts in the X direction. In an example of FIG. 4, the auxiliary member Q is omitted.

As shown in FIG. 4, the fitting of the tapered face 21 to the tapered face 11A in the X direction to hold the tendon C, that is, the wedge effect of the female member 10 and the male member 20, applies the lateral pressure F to the tendon C in the direction orthogonal to the surface of the tendon C. The lateral pressure F serves as an anchoring force for securing the tendon C to the anchoring device 1.

The lateral pressure F varies with the length of the area of contact between the anchoring device 1 and the tendon C in the X direction. For example, as the anchoring region has a smaller length, the area of contact between the tendon C and the anchoring region becomes smaller. In this case, the lateral pressure applied to the tendon C needs to be large enough to provide a large friction resistance in the region having the smaller contact area against the tensile load in the X direction. In contrast, when the anchoring region has a larger length, the area of contact between the tendon C and the anchoring region becomes larger. In this case, an appropriate friction resistance against the tensile load in the X direction can be provided even when the lateral pressure applied to the tendon C is not increased.

In the anchoring device 1 of the present embodiment, the length L in the X direction (axial direction) is increased to provide a long section (anchoring region) where the lateral pressure F acts on the tendon C formed of the filament body made of fiber reinforced plastic. The configuration allows the lateral pressure (anchoring force from the wedge effect) F for the tensile load to be distributed over the entire length of the tendon C placed in the anchoring region. As compared with the case where the lateral pressure F acts on a shorter section, the application of an excessive lateral pressure to the tendon C is suppressed to achieve the anchoring structure which is hardly to cause breaks or the like of the tendon C formed of the filament body made of fiber reinforced plastic.

Table 1 shows the test results of an evaluation test conducted in each of anchoring devices 1 (test subjects A to H) having different lengths L from one end to the other end of the female member 10 and the male member 20 in the X direction corresponding to the length direction of the tapered faces 11A and 21 in contact with the tendon C.

TABLE 1

|  | A | B | C | D | E | F | G | H |
|---|---|---|---|---|---|---|---|---|
| L (mm) | 100 | 125 | 130 | 150 | 175 | 200 | 250 | 300 |
| maximum load (kN) | 703.0 | 985.3 | 1031.7 | 1162.8 | 1237.8 | 1267.4 | 1275.1 | 1284.1 |
| anchoring efficiency (%) | 54.5 | 76.5 | 80.1 | 90.3 | 96.1 | 98.4 | 99.0 | 99.7 |
| break situation | tip | tip | tip | tip | tip | tip | tip | tip |
| (number of breaks) | 3 | 1 | 1 | 1 | 2 | 1 | 1 | 1 |
| evaluation | X | X | ◯ | ◯ | ◯ | ◯ | ◯ | ◯ |

In the evaluation test, the tensile test was conducted by mounting a filament body made of fiber reinforced plastic for use as a tendon in prestressed concrete construction method onto one end of each of the anchoring devices 1. The tensile test followed the standard "Method of Performance Test of Anchoring Device and Coupling Device for PC Construction with Continuous Fiber Reinforced Material" by Japan Society of Civil Engineers (JSCE-E537-1999). The filament body made of fiber reinforced plastic was formed in accordance with the standard "Quality Standard of Continuous Fiber Reinforced Material" (JSCE-E131-1999) by Japan Society of Civil Engineers.

Specifically, the filament body made of fiber reinforced plastic used was formed by twisting together wires made from composite material including carbon fiber and epoxy resin. The filament body made of fiber reinforced plastic has a diameter of 12.5 mm. The assured breaking load P0 is 1288 kN.

In the tensile test, a predetermined number of filament bodies made of fiber reinforced plastic are put in a test bench having a predetermined length. The number of filament bodies made of fiber reinforced plastic placed on the anchoring device 1 was set to 7 for the test. At each end of the test bench in the length direction, the anchoring device 1 was fixed to an excessive length of one end of each filament body made of fiber reinforced plastic on the test bench fixing side with the pressure bearing plate 40 interposed, and a jack (tensile test apparatus) was fixed to an excessive length of the other end of each filament body made of fiber reinforced plastic on the test bench tension side.

The jack applied a load at a predetermined tensile rate (loading rate) to each filament body made of fiber reinforced plastic secured at one end to the anchoring device 1. The loading by the jack was performed until the maximum tensile load was reached as apparent from a break of at least one of the filament bodies made of fiber reinforced plastic or deformation of the anchoring device 1.

The filament body made of fiber reinforced plastic used in the tensile test is not provided with a buffer (buffering layer) such as a braided net made of iron wire or the like and formed in a tubular shape conforming to the tendon C. The tensile test was conducted with the auxiliary member Q independent of the filament body made of fiber reinforced plastic placed in each of the seven mount portions 30. The auxiliary member Q was provided by using the friction sheet described above. In the anchoring structure with the anchoring device 1 used in the tensile test, at least part of the face of the filament body made of fiber reinforced plastic in the circumferential direction is in direct contact with the mount portion 30. The test subjects A to H have the same tapered angle (the inclination angle of the tapered faces 11A and 21 or the filament bodies made of fiber reinforced plastic placed along the tapered faces 11A and 21 relative to the axial direction in the anchoring region where the lateral pressure F acts) and different lengths L.

The anchoring efficiency in the evaluation test refers to the rate of a breaking load P in the tensile test (or a pull-out load when the filament body made of fiber reinforced plastic is pulled out of the anchoring device 1) to the assured breaking load P0 of the filament body made of fiber reinforced plastic. The anchoring efficiency is calculated as follows: anchoring efficiency(%)=(P/P0)×100.

As shown in Table 1, the mark "0" is put for the test subjects in which a high anchoring efficiency of 80% or higher was obtained, and the mark "X" is put for the test subjects in which a low anchoring efficiency of lower than 80% was obtained. In the evaluation test, a criterion of stable anchoring efficiency was set to 80% or higher.

This follows "Guideline (Draft) for Design and Construction of Concrete Building with Continuous Fiber, September, 1997" by Japan Society of Civil Engineers, and is based on the face that a load applied to the tendon in actual construction is 80% of the assured breaking load (P0) of the tendon at maximum. Thus, an anchoring efficiency of 80% or higher can provide sufficient anchoring performance for actual use, so that the criterion of stable anchoring efficiency for providing the sufficient anchoring performance is set to 80% or higher in the evaluation test based on the actual use at a construction site where 80% of the assured breaking load (P0) of the tendon is the maximum tensile load.

The test subject A is a conventional anchoring device for PC steel wire and has a length L of 100 mm. As obvious from Table 1, it is found that, as the length L of the anchoring device 1 becomes larger than that of the test subject A, the anchoring efficiency becomes higher. In other words, it is found that, as the section (anchoring region) where the lateral pressure F acts becomes longer, the lateral pressure for the tensile load (anchoring force from the wedge effect) is more distributed over the entire length of the filament body made of fiber reinforced plastic placed in the anchoring region. In all the test subjects A to H, the anchoring efficiency was calculated by using the tensile load (maximum load in Table 1) at the time of breaking of the filament body made of fiber reinforced plastic.

In the evaluation test, as the length L becomes longer than that of the test subject A, the anchoring efficiency provided can become higher than that of the test subject A. In the test subject B of the anchoring device 1 having a length L of 125 mm, an anchoring efficiency of 75.2% was provided. As the length L of the anchoring device 1 is further increased, the test subject C having a length L of 130 mm provided a high anchoring efficiency of 80.1% without breaking the filament body made of fiber reinforced plastic at a light load during the tensile test. The test subjects D, E, F, G, and H having lengths L larger than that of the test subject A provided high anchoring efficiencies of 90.3%, 96.1%, 98.4%, 99.0%, and 99.7%, respectively, without breaking the filament body made of fiber reinforced plastic at a light load during the tensile test. In the test results of the test subjects D, E, F, G, and H, it is found that the anchoring efficiency was not below 90% at a length L of 150 mm or larger and that an extremely high anchoring efficiency of 98% or higher was obtained at a length L of 200 mm or larger. In the tensile tests of the test subjects B, C, D, E, F, G, and H, only the test subject E had two broken filament bodies made of fiber reinforced plastic at the tip of the anchoring device 1, and the test subjects B, C, D, F, G, and H had only one broken filament body. In other words, the tensile tests of the test subjects B, C, D, E, F, G, and H did not show three or more broken filament bodies made of fiber reinforced plastic.

In the test subject A of the conventional anchoring device 1 for PC steel wire having the length L of 100 mm, the filament body made of fiber reinforced plastic was broken at a light load during the tensile test and thus a low anchoring efficiency of 54.5% was provided. The test subject A acted shearing force locally at the tip of the anchoring device 1 (tip of the male member 20) even at a light load to result in breaking of three of seven filament bodies made of fiber reinforced plastic. It is found that, since the test subject A had the small length L, the lateral pressure F for the tensile load was not able to be distributed appropriately over the entire length of the filament body made of fiber reinforced plastic placed in the anchoring region, so that a high anchoring efficiency was hardly obtained.

Figure 5:
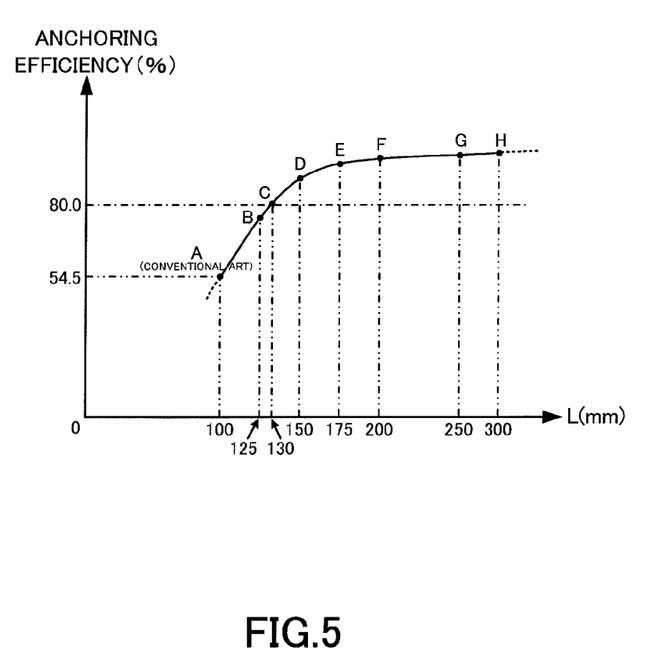
FIG. 5 is a graph showing the relationship between the length over which a lateral pressure acts on a tendon placed to be inclined along a tapered face of each of test subjects in Table 1 and an anchoring efficiency.

FIG. 5 is a graph showing the relationship between the length of each of the test subjects and the anchoring efficiency in the evaluation test results of Table 1. As shown in FIG. 5, the anchoring efficiency rises sharply from the test subject B relative to the test subject A which is the conventional anchoring device, and the test subject C having the length L of 130 mm or larger has the high anchoring efficiency of 80% or higher. In other words, it can be found apparently that, as the length L becomes smaller than 130 mm, the anchoring efficiency sharply reduces and only a low anchoring efficiency can be obtained. The anchoring efficiency of the test subject D rises sharply relative to the test subject C, which indicates that a high anchoring efficiency of 90% or higher is obtained at a length L of 150 mm or larger.

The test subjects F, G, and H having the length L of 200 mm or larger have the extremely high anchoring efficiencies of 98.4%, 99.0%, and 99.7%, respectively, and the anchoring efficiency of the test subject H increases to near 100%. It can be seen as shown in FIG. 5 that a further increase in anchoring efficiency is unlikely to be expected in a range of the length L larger than 300 mm. Since the tapered angle is constant (same) even when the length L is increased, the test subjects A to H have the outer dimensions increased gradually and the weights increased accordingly. Thus, the upper limit of the length L is set to 300 mm and the length L is set in a range from 130 mm to 300 mm or 150 mm to 300 mm, thereby making it possible to provide the anchoring device for the filament body made of fiber reinforced plastic that is reduced in size and weight while the stable anchoring performance is achieved.

With regard to the improvement in anchoring efficiency and the reduction in size and weight of the anchoring device, the increase rate of the anchoring efficiency (slope in FIG. 5) reduces after the test subject F. Thus, the upper limit of the length L may be set to 200 mm which is the length L of the test subject F capable of providing the high anchoring efficiency of 98.4% or higher, and for example, the length L may be set in a range from 130 mm to 200 mm or 150 mm to 200 mm. This can provide the anchoring device for the filament body made of fiber reinforced plastic further reduced in size and weight while the stable anchoring performance is achieved. Alternatively, the upper limit of the length L may be set to 250 mm which is the length L of the test subject G capable of providing the high anchoring efficiency of 99.0% or higher, and for example, the length L may be set in a range from 130 mm to 250 mm or 150 mm to 250 mm. This can provide the anchoring device for the filament body made of fiber reinforced plastic reduced in size and weight as compared with the test subject H having the length L of 300 mm while the stable anchoring performance is achieved.

As described above, the evaluation test was conducted for the anchoring structure including the plurality of filament bodies made of fiber reinforced plastic placed at the predetermined intervals in the circumferential direction of the tapered face formed between the female member 10 and the male member 20 of the anchoring device 1. When the length L corresponding to the anchoring region of the anchoring device 1 was 130 mm or larger, no filament body made of fiber reinforced plastic was broken at a light load until the anchoring efficiency reached 80%.

Particularly when the length L corresponding to the anchoring region of the anchoring device 1 was 150 mm or larger, the anchoring efficiency was not below 90% and a high friction resistance was provided against the tensile load. It can be seen that, in the anchoring device 1 having the length of 150 mm or larger, the lateral pressure F for obtaining a high friction resistance against the tensile load is more distributed over the entire length of the filament body made of fiber reinforced plastic placed in the anchoring region, so that the breaks or the like of the filament body made of fiber reinforced plastic can be prevented and a large anchoring force can be applied at the same time.

The anchoring device 1 of the present embodiment is the anchoring device for the filament body made of fiber reinforced plastic in which the male member 20 is inserted into the female member 10 to sandwich and secure the tendon C of the filament body made of fiber reinforced plastic between them, and includes the plurality of mount portions 30 where the plurality of tendons C are placed at the predetermined intervals in the circumferential direction of the inclined tapered face between the female member 10 and the male member 20. The length from one end to the other end of the female member 10 and the male member 20 corresponding to the length direction of the tapered face in contact with the tendon C is 130 mm or larger.

Since the large length of 130 mm or more is set to the length over which the lateral pressure acts on the tendon C placed to be inclined along the tapered face, the lateral pressure acts on the larger section of the tendon C formed of the filament body made of fiber reinforced plastic as apparent from the evaluation test results in Table 1. This can distribute the lateral pressure for the tensile load over the entire tendon C while the tendon C can be secured with the high anchoring efficiency. Consequently, rather than the buffer distributing the shearing force or the like local to the tendon C, the anchoring structure can suppress the application of an excessive lateral pressure to the tendon C formed of the filament body made of fiber reinforced plastic to accomplish the anchoring such that the breaks or the like of the tendon C hardly occur.

Specifically, the anchoring structure of the present embodiment can realize the anchoring which hardly causes the breaks or the like of the tendon C formed of the filament body made of fiber reinforced plastic as long as the length L corresponding to the anchoring region is 130 mm or larger. More preferably, as shown in Table 1, the length L corresponding to the anchoring region of the anchoring device 1 can be set to 150 mm or larger to achieve the stable anchoring with an anchoring efficiency of 90% or higher. More preferably, the length L corresponding to the anchoring region of the anchoring device 1 can be set to 200 mm or larger to realize the stable anchoring with an anchoring efficiency of 98% or higher.

In contrast to the conventional anchoring device, the anchoring device 1 of the present embodiment can achieve the anchoring operation in which the tendon C is anchored by the female member 10 and the male member 20 at a workplace for a building structure or the like which is an actual construction site.

The conventional anchoring device requires one wedge for one tendon as described in International Publication WO 2011/019075 and needs a plurality of wedges for securing a plurality of tendons C, for example. The anchoring operation of applying the lateral pressure from the individual wedge effect to each of the plurality of tendons to secure them at the workplace is complicated and impractical. In securing the plurality of tendons with one anchoring device, the conventional technique requires that the anchoring device should be bonded to the tendons by cement or the like. If the cement does not sufficiently harden in the bonding, the anchoring of the anchoring device to the tendons may be inadequate, so that the operation of anchoring the anchoring device to the tendon cannot be performed at an actual construction site for a building structure or the like. For this reason, the operation of bonding the anchoring device to the tendons by the cement or the like is needed previously at a factory different from the construction site.

As described above, conventionally, the tendon placed on the anchoring device is carried to the building structure or the like which is the construction site such that the tendon preset on the anchoring device is set on the building to be constructed. This presents a problem in which the operation of anchoring the anchoring device to the tendon cannot be performed at the construction site and the workability cannot be improved.

In contrast, in the anchoring device 1 of the present embodiment, the female member 10 and the male member 20 can be mounted at the construction site such as a building as described above to simply secure the plurality of tendons C extended in the concrete 50 to the anchoring device 1, with the result that high workability is accomplished. For example, the anchoring device 1 can be easily and accurately set with the length of the tendon C adjusted at the workplace. Since the anchoring operation does not require the cement or the like, the tensile load applied to the tendon C can be easily adjusted to set the anchoring device 1 suitably for construction conditions at the site.

The invention claimed is:

1. An anchoring device, comprising:
   a pressure bearing plate in contact with concrete;
   a plurality of tendons, each of the plurality of tendons having a filament body made of fiber reinforced plastic;
   a one piece female member; and
   a male member configured to be inserted into the one piece female member to sandwich and secure the plurality of tendons between the one piece female member and the male member,
   wherein the one piece female member has a tapered shape inclined from a first end of the one piece female member toward a second end of the one piece female member, the second end of the one piece female member is in contact with the pressure bearing plate, an outer diameter of the one piece female member is constant from the first end of the one piece female member to the second end of the one piece female member, the male member has a tapered shape inclined from a first end of the male member toward a second end of the male member, and each of the one piece female member and the male member includes a plurality of mount portions at predetermined intervals in a circumferential direction of an inclined tapered face between the one piece female member and the male member, each of the plurality of tendons being placed on a corresponding one of the plurality of mount portions of each of the one piece female member and the male member,
   wherein the plurality of mount portions of the one piece female member and the plurality of mount portions of the male member define placement spaces for the plurality of tendons, respectively, and each placement space is smaller than a substantially circular cross section of a corresponding one of the plurality of tendons,
   wherein a length from the first end to the second end of each of the one piece female member and the male member corresponding to a longitudinal direction of the inclined tapered face in contact with the plurality of tendons is equal to or larger than 130 mm,
   wherein at least one of the plurality of mount portions of the male member is a first arc-shaped mount portion having a concave shape extending inward from an outer circumferential face and contacting a circumferential face of the corresponding one of the plurality of tendons,
   wherein at least one of the plurality of mount portions of the one piece female member is a second arc-shaped mount portion provided at a position associated with the first arc-shaped mount portion when the male member is inserted, the second arc-shaped mount portion having a concave shape extending outward from an inner circumferential face and contacting the circumferential face of the corresponding one of the plurality of tendons, wherein the first arc-shaped mount portion and the second arc-shaped mount portion define the placement space for the corresponding one of the plurality of tendons and are in contact with the corresponding one of the plurality of tendons to hold the corresponding one of the plurality of tendons in the circumferential direction, and wherein the second arc-shaped mount portion is in contact with the corresponding one of the plurality of tendons from the first end of the one piece female member to the second end of the one piece female member.

2. The anchoring device according to claim 1, wherein the length is equal to or larger than 150 mm.

3. The anchoring device according to claim 2, wherein the length is equal to or smaller than 300 mm.

4. The anchoring device according to claim 2, further comprising a friction sheet placed between at least one of the first arc-shaped mount portion and the second arc-shaped mount portion and the corresponding one of the plurality of tendons, and extending from the first end of the at least one of the one piece female member and the male member toward the second end of the at least one of the one piece female member and the male member along the inclined tapered face.

5. The anchoring device according to claim 1, wherein the length is equal to or smaller than 300 mm.

6. The anchoring device according to claim 5, further comprising a friction sheet placed between at least one of the first arc-shaped mount portion and the second arc-shaped mount portion and the corresponding one of the plurality of tendons, and extending from the first end of the at least one of the one piece female member and the male member toward the second end of the at least one of the one piece female member and the male member along the inclined tapered face.

7. The anchoring device according to claim 1, further comprising a friction sheet placed between at least one of the first arc-shaped mount portion and the second arc-shaped mount portion and the corresponding one of the plurality of tendons, and extending from the first end of the at least one of the one piece female member and the male member toward the second end of the at least one of the one piece female member and the male member along the inclined tapered face.

* * * * *